Nov. 30, 1937.  P. A. LINDEMANN  2,100,485
DRAIN VALVE FOR COMPRESSED AIR RESERVOIRS AND THE LIKE
Filed Sept. 9, 1936  2 Sheets-Sheet 1
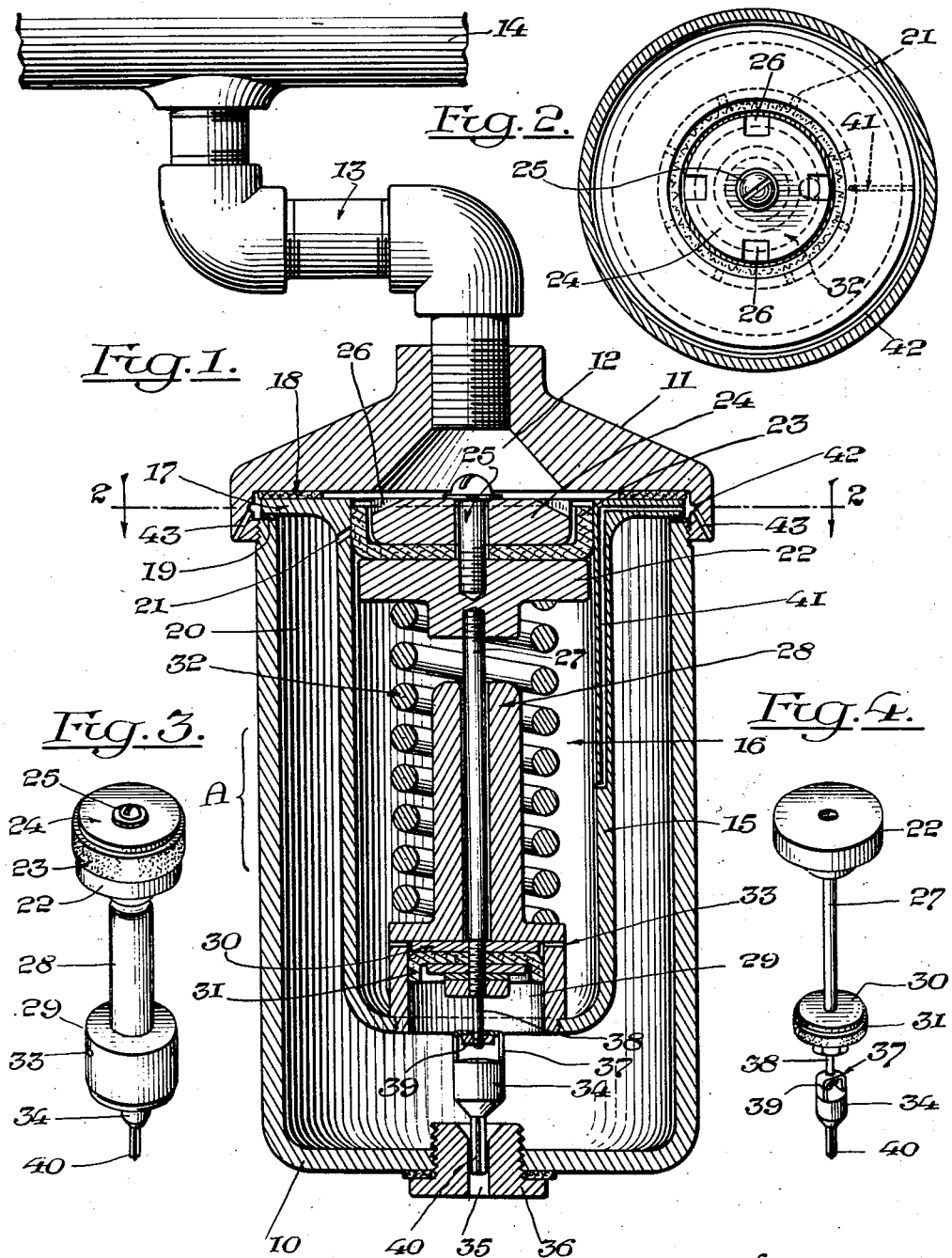

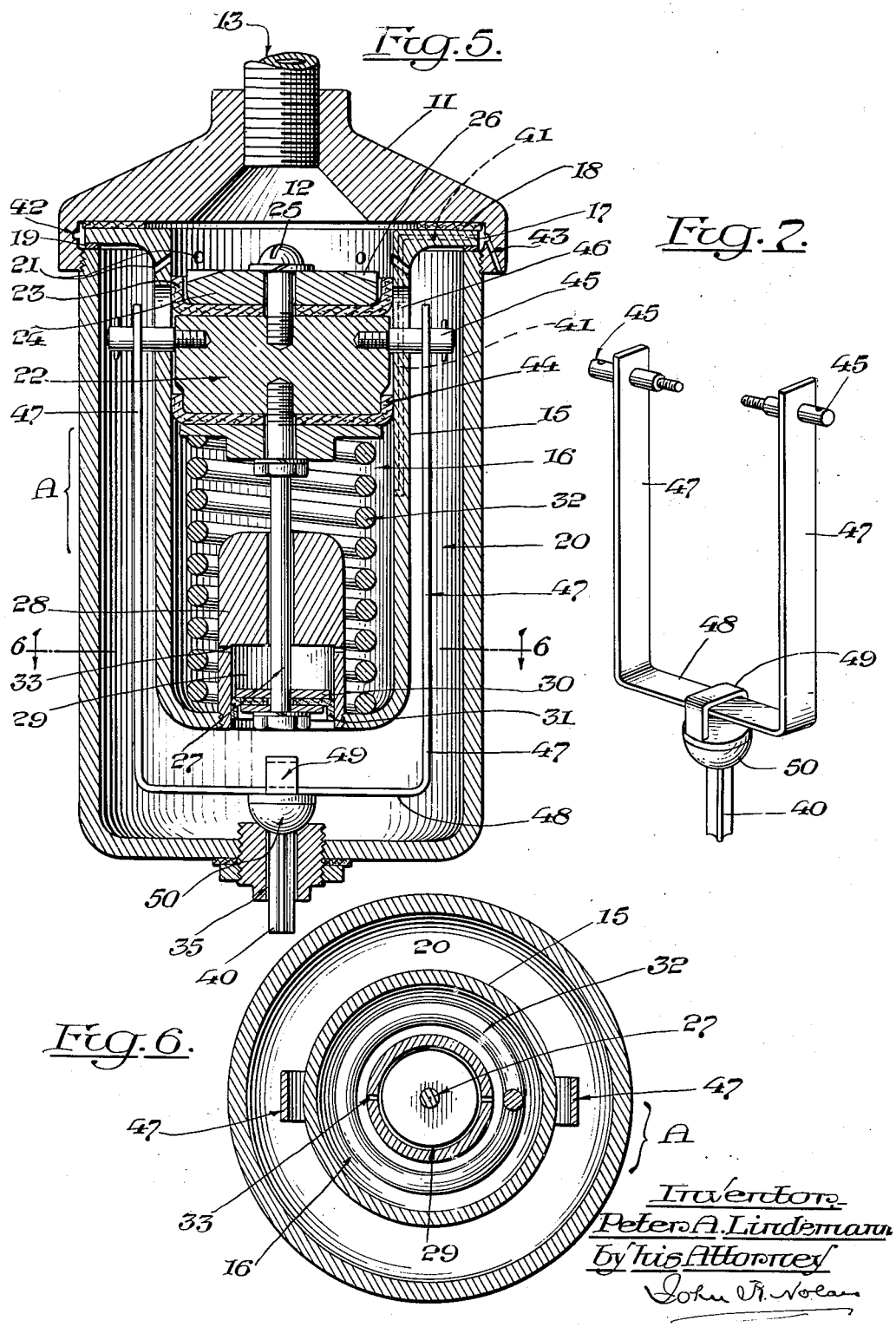

Patented Nov. 30, 1937

2,100,485

UNITED STATES PATENT OFFICE 2,100,485

DRAIN VALVE FOR COMPRESSED AIR RESERVOIRS AND THE LIKE

Peter A. Lindemann, Downsville, N. Y.

Application September 9, 1936, Serial No. 99,912

9 Claims. (Cl. 137—103)

This invention relates to drain valves for compressed air reservoirs, such, for example, as are used in connection with air brake systems; the object of the invention being to provide a valve device of simple and efficient construction and operation which automatically effects the removal of water or other liquid accumulations from a compressed air reservoir or the like with which the device is associated.

With this and other objects in view my invention comprises a drain valve having novel features of construction and combinations of parts which will be hereinafter described, the scope of the invention being expressed in the appended claims.

In the drawings—

Figure 1 is a longitudinal vertical section of a drain valve embodying a preferred form of my invention, showing the device connected with a compressed air reservoir and in closed or sealing relation thereto.

Fig. 2 is a transverse horizontal section through the drain valve, as on the line 2—2 of Fig. 1.

Fig. 3 is a perspective view of a double control valve and its mounting.

Fig. 4 is a similar view of said valve showing its connection with the valve for the discharge port of the structure.

Fig. 5 is a view similar to Fig. 1 of a modified form of drain valve, showing its elements in opening or draining relation to the reservoir.

Fig. 6 is a transverse section through the drain valve, as on the line 6—6 of Fig. 5.

Fig. 7 is a perspective view of a U-strap for connecting the relatively movable valve members of the structure shown in Fig. 5.

Referring to Figs. 1, 2, 3 and 4 of the drawings, A designates a housing, preferably cylindrical, having a bottom 10 and a flanged screw head 11, the latter being provided with a suitable pressure chamber 12 adapted to be communicably connected through a pipe 13 with a compressed air reservoir 14, such, for example, as is used in connection with air-brake systems. Arranged within the housing is a depending casing 15 affording an elongated chamber 16 whereof the upper end is open and is provided with a flange 17 which is tightly clamped between the screw head 11 and the top of the housing wall. Gaskets 18 and 19 are interposed between the upper and lower sides of the flange 17 and the opposing members, respectively, in order to ensure an airtight joint for the assembled elements.

The casing, which is preferably cylindrical, is spaced from the wall and bottom of the housing, so as to provide a chamber 20, and the wall of the casing has formed therein adjacent its flanged upper end a port or series of ports 21 which, when open, afford a passage or passages between the upper interior of the casing and the top of the chamber 16.

A piston valve 22 comprising a body having an upper cup washer 23, is slidably mounted within the upper portion of the casing 15 in operative relation to the ports 21, which washer is clamped to the valve body by a head 24 through which passes a central securing screw 25. The upper surface of the clamping head 24 is preferably provided with inclined marginal recesses 26 which lead to the up-turned wall of the washer 23, thus ensuring the pressure of the air against such wall in order to maintain it at all times in effective contact with the inner wall of the casing.

Depending from the piston valve 22 is a central stem 27 which is vertically guided in a tubular post 28 within the chamber 16 of the casing 15, which post terminates in a basal cylinder 29 screwed or otherwise secured in the wall of a suitable opening in the bottom of the casing. The foot of the stem 27 has secured thereto a relatively small piston valve 30 having a cup washer 31, which valve is reciprocative within the cylinder 29 concurrently with the upper piston valve. The two piston valves 22 and 30 thus connected by the stem 27 are held normally in raised position by means of a spring 32 of determined strength, which spring, encircling the post, is interposed between the upper valve and the top of the cylinder 29.

When the valve 22 is in its normal or raised position the washer 23 seals the adjacent ports 21 in the casing 15, and the lower valve 30 is at the top of its stroke within the cylinder 29, which cylinder is provided at its upper end with one or more air bleeding ports 33. When the upper valve is sufficiently depressed by the action of the air pressure thereon the washer 23 clears the ports 21 and affords communication between the interior of the casing and the upper portion of the chamber 20.

The lower end of the valve stem 27 is slidably connected with a valve member 34 having a conic or convex lower surface adapted to co-act with the conical mouth of a central discharge port 35 in the housing bottom in a manner to open and close the port 35 during the upward and downward movements respectively of the associated piston valves. In the present instance the port 35 is formed in a suitable threaded fitting 36 in the housing bottom, and the valve 34 is provided with an upper loop 37 having an orifice through which freely slides a downward extension 38 of the stem 27, the extremity of such extension having a stop nut or foot 39 which underlies the loop. Thus relative vertical movement is permitted between the valve stem and the valve 34 to ensure the effective seating of the conic or convex surface of the valve in the corresponding mouth of the port 35 when the valves 22 and 30 are depressed and during the initial upward movement of the latter valves. The valve 34 in the form shown has a depending guide stem 40 which is loosely fitted in the discharge port 35 of the fitting 36.

In the wall of the casing 15 is a vertical vent port 41 the lower end of which communicates with the chamber 16 and the upper end of which port communicates with an internal annular groove 42 in the flange of the screw head 11, which groove, in turn, communicates with the outside atmosphere by one or more ports 43 in such flange.

By the foregoing described construction embodying my invention, it will be seen that when the air within the reservoir to which the device is connected, reaches a certain pressure, the air with the entrained water or other liquid issuing from the reservoir through the chamber 12 of the head 11 impinges against the top of the opposing piston valve 22 and forces it down against the determined pressure of the spring 32 in a manner to open the ports 21, thus permitting the passage into the chamber 20 of the air and the entrained water or other liquid expelled from the reservoir. When the pressure within the chamber 12 drops below the force of the spring, the piston valve 22 is caused to resume its normal or raised position, thus closing the ports 21 and lifting the valve 34 from its seat through the described lost-motion connection between the stem 27 and the latter valve, thus permitting the escape of the water and air through the discharge port 35 in the bottom of the housing. Air within the chamber 16 below the piston valve 22 escapes to the outside atmosphere by way of the vent port 41 during the depression of such valve, thus relieving the air resistance to the valve.

The function of the smaller piston 30 and its cylinder 29 is to compensate for the wide range of frictional resistance to the moving piston 22 on account of changes in temperatures and of the contents of the water of condensation, including added soap, oil, etc., it being noted that when the air pressure in chamber 12 forces the piston 22 downward to open the ports 21, the pressure enters and builds up in the chamber 20, thus causing an upward pressure on the lower piston 30. Such upward pressure assists the spring 32 in overcoming the downward pressure of the piston 22 and causing it to move upward at a smaller variation in pressure in chamber 12 than would be possible by the spring alone.

In Figs. 5, 6 and 7 of the drawings is shown a modified construction wherein similar characters indicate the corresponding parts of the previously described structure.

In the modification the valve 22 is provided with a lower cup washer 44 and also with radial pins 45 which project through vertical guide slots 46 in the wall of the casing 15. The spaced relation of the cup washers 23 and 44 is such that when the valve 22 is depressed to open the ports 21, the upper washer affords a seal for the upper ends of the slots 46, and the lower washer by its contact with the casing below the slots affords a seal between the slots and the chamber 16 within which the spring 32 is mounted. The pins 45 support the upper ends of a U-strap 47 which straddles the casing and has its lower cross-member 48 disposed below the bottom of the casing. This cross-member extends freely through a metal loop 49 on the upper flat face of a semi-spherical valve 50 in a manner to permit relative vertical movement between the cross member and the valve. This valve 50 overlies the discharge port 35 in the housing bottom and is adapted to open and close such port by and during the reciprocation of the strap 47 by the vertical movements of the valve 22; the lost motion between the strap and the valve 50 ensuring the effective seating of the convex surface of the valve on the concave mouth of the port 35.

It is to be understood that my invention is not limited to the particular forms of embodiment thereof herein disclosed, as the construction may be variously modified within the principle of the invention and the scope of the appended claims.

I claim—

1. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a spring normally urging said valve into sealing relation with the said passage, a valve for said discharge opening, means including a lost-motion coupling operatively connecting said latter valve with the piston valve, and vent means leading from the interior of the casing to the outside atmosphere.

2. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a spring normally urging said valve into sealing relation with the said passage, a valve for said discharge opening, an element secured to and slidable with said piston valve and depending therefrom, and a lost-motion connection between said element and said discharge valve.

3. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a smaller piston valve connected to and movable with said first-named valve, a cylinder for said smaller valve opening into the chamber between the casing and the housing, a spring within said casing normally urging said first-named valve into sealing relation with the said passage, a valve for said discharge opening, and means operatively connecting said latter valve with the piston valve.

4. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a smaller piston valve connected to and movable with said first-named valve, a cylinder for said smaller valve opening into the chamber between the casing and the housing, a spring within said casing normally urging said first-named valve into sealing relation with the said passage, a valve for said discharge opening, means operatively connecting said latter valve with the piston valve, and vent means leading from the interior of said casing to the outside atmosphere.

5. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a smaller piston valve connected to and movable with said first-named valve, a cylinder for said smaller valve opening into the chamber between the casing and the housing, a spring within said casing normally urging said first-named valve into sealing relation with the said passage, a valve for said discharge opening, an element secured to and slidable with said piston valves and depending therefrom, and a lost-motion connection between said element and said discharge valve.

6. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a spring normally urging said valve into sealing relation with the said passage, a valve for said discharge opening, and a U-shaped element straddling said casing and having its ends connected to and slidable with the piston valve, said discharge valve having a member through which the cross-member of the U-shaped element freely extends.

7. A drain valve for the purpose described, comprising a housing, a casing supported within said housing to provide a chamber between the casing and the housing, said housing having an air inlet leading to the interior of the casing, and also having a discharge opening, and said casing having a passage in communication with the said chamber, a piston valve mounted in said casing in co-operative relation to said air inlet and passage, a spring normally urging said valve into sealing relation with the said passage, a valve for said discharge opening, vent means leading from the interior of the casing to the outside atmosphere, and a U-shaped element straddling said casing and having its ends connected to and slidable with the piston valve, the cross-member of said element having a lost-motion connection with the discharge valve.

8. A drain valve for the purpose described, comprising a housing, a casing supported within said housing to provide a chamber between the casing and the housing, said housing having an air inlet leading to the interior of the casing and also having a discharge opening, and said casing having a passage in communication with said chamber and also having guide slots adjacent the plane of the passage, a piston valve mounted in said casing in co-operative relation to the said inlet, passage and slots, and comprising a body portion and upper and lower cup-shaped gaskets, a spring normally urging said valve into sealing relation with the said passage and slots, a valve for said discharge opening, a U-shaped element straddling the casing, pins extending from the piston valve through the slots in the casing and supporting the ends of said element, and a connection between said discharge valve and the cross-member of said element.

9. In a drain valve for the purpose described, a structure embodying a valve casing having an inlet in communication with a compressed air reservoir, and a chamber in communication with said casing, said chamber having a discharge opening and being adapted to receive water accumulations expelled from the reservoir, a piston valve mounted in said casing, a spring of determined force normally supporting said valve in a position to close the communication between the casing and the chamber, a valve having a convex sealing surface for the discharge opening, and coupling means for the valves including a lost-motion connection for the discharge valve.

PETER A. LINDEMANN.